(12) United States Patent
Ciubotariu

(10) Patent No.: US 11,803,642 B1
(45) Date of Patent: Oct. 31, 2023

(54) OPTIMIZATION OF HIGH ENTROPY DATA PARTICLE EXTRACTION

(71) Applicant: Amazon Technologies, Inc., Seattle, WA (US)

(72) Inventor: Mircea Ciubotariu, Culver City, CA (US)

(73) Assignee: Amazon Technologies, Inc., Seattle, WA (US)

( * ) Notice: Subject to any disclaimer, the term of this patent is extended or adjusted under 35 U.S.C. 154(b) by 300 days.

(21) Appl. No.: 17/219,438

(22) Filed: Mar. 31, 2021

(51) Int. Cl.
*G06F 21/56* (2013.01)
*G06F 16/22* (2019.01)

(52) U.S. Cl.
CPC ........ *G06F 21/565* (2013.01); *G06F 16/2237* (2019.01); *G06F 21/566* (2013.01); *G06F 2221/033* (2013.01)

(58) Field of Classification Search
CPC .. G06F 21/565; G06F 16/2237; G06F 21/566; G06F 2221/033; G06F 21/56
See application file for complete search history.

(56) References Cited

U.S. PATENT DOCUMENTS

| | | | |
|---|---|---|---|
| 10,896,256 B1 * | 1/2021 | Saxe | G06N 3/04 |
| 10,929,531 B1 | 2/2021 | Kenemer et al. | |
| 2012/0151586 A1 | 6/2012 | Hentunen | |
| 2016/0335435 A1 * | 11/2016 | Schmidtler | G06F 21/565 |
| 2021/0117544 A1 * | 4/2021 | Kurtz | G06F 21/566 |
| 2022/0237293 A1 * | 7/2022 | Schmidtler | G06N 20/10 |
| 2022/0309077 A1 * | 9/2022 | Pomerantsev | G06F 16/906 |

FOREIGN PATENT DOCUMENTS

WO WO-2017111912 A1 * 6/2017 ........... G06F 21/564

OTHER PUBLICATIONS

Stolfo et al—"Fileprint analysis for Malware Detection" —Columbia IDS Lab, Jun. 2005 (Year: 2005).*
Jeong et al—"Malware Detection on Byte Streams of PDF Files" —Wiley—Security and Communication Networks vol. 2019, Article ID 8485365, Apr. 3, 2019 (Year: 2019).*
Lam Or et al—"Memory-Based Hardware Architectures to Detect ClamAV Virus Signatures with Restricted Regular Expression Features" —IEEE Transactions on Computers, vol. 65, No. 4, Apr. 2016 (Year: 2016).*
U.S. Appl. No. 17/159,824, Pending.
Non-Final Office Action, U.S. Appl. No. 17/159,824, dated May 25, 2023, 14 pages.

* cited by examiner

*Primary Examiner* — Jayesh M Jhaveri
(74) *Attorney, Agent, or Firm* — NICHOLSON DE VOS WEBSTER & ELLIOTT LLP

(57) ABSTRACT

Techniques for particle-based threat scanning are described. A method of extracting particles from high entropy data may include obtaining a sample from a sample source, identifying an anchor particle in the sample, generating a plurality of particles following the anchor particle based on a particle limit, wherein each particle from the plurality of particles is an array of unique bytes generated based on one or more particle properties, and storing the plurality of particles following the anchor particle in a particle database.

20 Claims, 11 Drawing Sheets

OPTIMIZATION OF HIGH ENTROPY DATA PARTICLE EXTRACTION

BACKGROUND

Malware scanning can be used to identify malicious software, such as computer viruses, on storage volumes. The easiest way to identify threat files is by hash, in which a hash is computed using a hashing algorithm for a file and compared to a threat list and/or safe list to determine whether the file is a known threat or a known clean file. Traditional hash-based systems generate an individual hash for each file. However, this requires computing trillions of hashes, some of which may correspond to large files, which is computationally expensive and difficult to scale.

BRIEF DESCRIPTION OF DRAWINGS

Various embodiments in accordance with the present disclosure will be described with reference to the drawings, in which.

DETAILED DESCRIPTION

Figure 1:
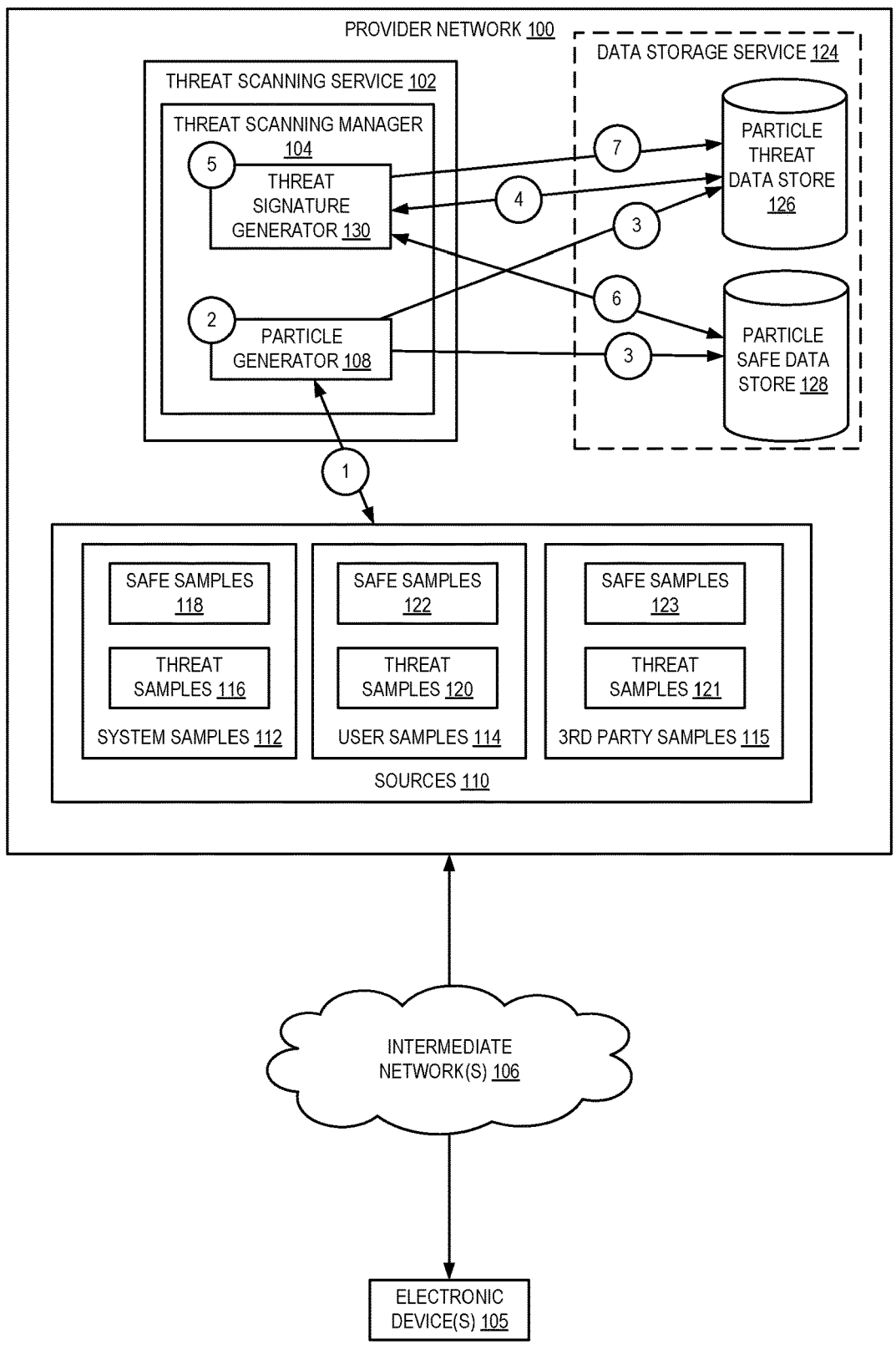
FIG. 1 is a diagram illustrating an environment for generating particles for threat samples and safe samples according to some embodiments.

The present disclosure relates to methods, apparatus, systems, and non-transitory computer-readable storage media for particle encoding for optimizing high entropy particle extraction. According to some embodiments, particle encoding enables threat patterns to be detected based on regular expressions. This allows for a given sample to be classified as a threat more broadly, as a pattern can be found to cover different threat samples. Traditional threat scanning systems use hashing to uniquely identify particular threats. Being able to identify threats more generically (e.g., based on data that is shared by threats but not by non-threats) can improve scanning performance by reducing the amount of data needed to reliably identify a potential threat. For example, instead of computing full hashes for every sample, embodiments compute particles of samples. A particle is an array of bytes where repeating bytes have been omitted, as the repeating bytes provide too little information for identification purposes (e.g., uniqueness). To be effective, these particles must be of a form that is readily usable by machines for automated threat detection. Additionally, the size of the particles should be as small as possible to detect threats reliably without risking false positives due to collisions with safe samples.

Data with few repetitions are therefore good sources of particles. This means that higher entropy data is a good source of particles, as repetitions in the data lower the entropy of the data. Entropy in this context is defined in terms of a probabilistic model in which the entropy is related to the occurrence frequency of characters in the data. Since there are far fewer repetitions expected in high entropy data, the system may observe an almost 100% rate of particle extraction from the highest entropy data. However, high entropy data is mostly a by-product of two major processes: compression, where certain patterns are reduced in order to save storage space; and encryption, where plaintext is transformed through some mathematical function. The problem is both of these processes produce unique sets of data that change dramatically overall with small changes in the underlying data/encryption key, severely limiting the usefulness of particles extracted from this data to be used for finding similarities among various data sets. As such, high entropy data leads to a large number of particles being produced without improving the overall ability of the system to reliably identify threats. Since much data is stored compressed, encrypted, or both, this leads to a large number of particles being produced which results in larger storage requirements.

In some embodiments, particles are generated from known threats to create a particle data store. To keep this threat data store lightweight, embodiments selectively store particles that are generated from high entropy blocks based on where anchor particles are identified within these blocks. Anchor particles refer to particles that have been compressed (e.g., due to the presence of byte repetitions in the high entropy data block). Once an anchor particle in a high entropy block is identified, then a configurable number of subsequent particles are stored. Once a maximum number of particles has been stored, then subsequent particles are discarded until another anchor particle is encountered or until the entire source has been processed. As a result, particles are extracted from the portions of high entropy blocks most likely to include useful information for pattern matching (e.g., those portions of the high entropy block having a lower entropy). This keeps the particle data store lightweight while still enabling threat patterns to be readily identified.

FIG. 1 is a diagram illustrating an environment for generating particles for threat samples and safe samples according to some embodiments. As shown in FIG. 1, a provider network 100 includes threat scanning service 102. Threat scanning service 102 implements the particle-based threat scanning techniques described herein. In various embodiments, threat scanning service 102 scans samples from a plurality of sources, which may include customer resources, provider network resources, etc. The threat scanning service 102 can compute particles from the samples and use these particles to build a particle threat data store and a particle safe data store. These particle data stores are used to generate reliable particle threat signatures for new threat families and to identify unknown samples as either malicious or safe.

A provider network 100 (or, "cloud" provider network) provides users with the ability to utilize one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources may be provided as services, such as a hardware virtualization service that can execute compute instances, a storage service that can store data objects, etc. The users (or "customers") of provider networks 100 may utilize one or more user accounts that are associated with a customer account, though these terms may be used somewhat interchangeably depending upon the context of use. Users may interact with a provider network 100 across one or more intermediate networks 106 (e.g., the internet) via one or more interface(s), such as through use of application programming interface (API) calls, via a console implemented as a website or application, etc., using one or more electronic devices 105. An API refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another. The interface(s) may be part of, or serve as a front-end to, a control plane of the provider network 100 that includes "backend" services supporting and enabling the services that may be more directly offered to customers.

For example, a cloud provider network (or just "cloud") typically refers to a large pool of accessible virtualized computing resources (such as compute, storage, and networking resources, applications, and services). A cloud can provide convenient, on-demand network access to a shared pool of configurable computing resources that can be programmatically provisioned and released in response to customer commands These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

A cloud provider network can be formed as a number of regions, where a region is a geographical area in which the cloud provider clusters data centers. Each region includes multiple (e.g., two or more) availability zones (AZs) connected to one another via a private high-speed network, for example a fiber communication connection. An AZ (also known as an availability domain, or simply a "zone") provides an isolated failure domain including one or more data center facilities with separate power, separate networking, and separate cooling from those in another AZ. A data center refers to a physical building or enclosure that houses and provides power and cooling to servers of the cloud provider network. Preferably, AZs within a region are positioned far enough away from one another so that a natural disaster (or other failure-inducing event) should not affect or take more than one AZ offline at the same time.

Customers can connect to AZ of the cloud provider network via a publicly accessible network (e.g., the Internet, a cellular communication network), e.g., by way of a transit center (TC). TCs are the primary backbone locations linking customers to the cloud provider network and may be collocated at other network provider facilities (e.g., Internet service providers (ISPs), telecommunications providers) and securely connected (e.g., via a VPN or direct connection) to the AZs. Each region can operate two or more TCs for redundancy. Regions are connected to a global network which includes private networking infrastructure (e.g., fiber connections controlled by the cloud provider) connecting each region to at least one other region. The cloud provider network may deliver content from points of presence (or "POPs") outside of, but networked with, these regions by way of edge locations and regional edge cache servers. This compartmentalization and geographic distribution of computing hardware enables the cloud provider network to provide low-latency resource access to customers on a global scale with a high degree of fault tolerance and stability.

To provide these and other computing resource services, provider networks 100 often rely upon virtualization techniques. For example, virtualization technologies may be used to provide users the ability to control or utilize compute resources (e.g., a "compute instance" such as a VM using a guest operating system (O/S) that operates using a hypervisor that may or may not further operate on top of an underlying host O/S, a container that may or may not operate in a VM, a compute instance that can execute on "bare metal" hardware without an underlying hypervisor), where one or multiple compute resources can be implemented using a single electronic device. Thus, a user may directly utilize a compute resource (e.g., provided by a hardware virtualization service) hosted by the provider network to perform a variety of computing tasks. Additionally, or alternatively, a user may indirectly utilize a compute resource by submitting code to be executed by the provider network (e.g., via an on-demand code execution service), which in turn utilizes one or more compute resources to execute the code—typically without the user having any control of or knowledge of the underlying compute instance(s) involved.

In various embodiments, a "serverless" function may include code provided by a user or other entity—such as the provider network itself—that can be executed on demand Serverless functions may be maintained within provider network 100 by an on-demand code execution service and may be associated with a particular user or account or be generally accessible to multiple users/accounts. A serverless function may be associated with a Uniform Resource Locator (URL), Uniform Resource Identifier (URI), or other reference, which may be used to invoke the serverless function. A serverless function may be executed by a compute resource, such as a virtual machine, container, etc., when triggered or invoked. In some embodiments, a serverless function can be invoked through an application programming interface (API) call or a specially formatted HyperText Transport Protocol (HTTP) request message. Accordingly, users can define serverless functions that can be executed on demand, without requiring the user to maintain dedicated infrastructure to execute the serverless function. Instead, the serverless functions can be executed on demand using resources maintained by the provider network 100. In some embodiments, these resources may be maintained in a "ready" state (e.g., having a pre-initialized runtime environment configured to execute the serverless functions), allowing the serverless functions to be executed in near real-time.

As shown in FIG. 1, threat scanning service 102 includes a threat scanning manager 104 which includes a particle generator 108. Threat scanning manager 104 can manage generation of particle threat data store 126 and particle safe data store 128. These data stores can each include particles associated with known threat samples and known safe samples. In some embodiments, these data stores may be implemented in a data storage service 124, such as a database service, block storage service, object storage service, etc. Additionally, the particle threat data store 126 and particle safe data store 128 may be implemented as various data structures, such as databases, At numeral 1, particle generator 108 of threat scanning manager 104 can read one or more samples from one or more sources 110. As discussed, this may include one or more files, memory dumps, disk images, etc. In particular, the sources 110 used to generate the particle threat data store 126 and particle safe data store 128 can include known safe samples 118, 122, 123 and known threat samples 116, 120, 121. These samples may be provided by provider network 100 (e.g., system samples 112), by one or more users (e.g., user samples 114), and/or by third party malware monitoring services (e.g., third party samples 115). At numeral 2, the particle generator 108 then generates particles for each sample. Although a single particle generator is shown in FIG. 1, in various embodiments a plurality of particle generator instances may be employed to process samples in parallel.

As discussed, a particle is a sequence of non-repeating bytes (e.g., each byte in a particle is unique as compared to every other byte in that particle) extracted from a sample that can be used to reliably identify threat samples (e.g., malware). Ideally, particles should be as small as possible while still being able to reliably identify threats without collisions with safe samples (resulting in false positives). This minimum size depends on the quantity and type of data that will be scanned by the threat scanning service 102. Based on the types of data typically stored by a cloud storage provider and an examination of the typical size distribution of this data, a cloud storage provider may be expected to store approximately 264 bytes of data. Statistically, a pattern of 8 bytes is almost guaranteed to be identified at least once in a dataset this size. Almost, because it also matters what kind of data it is, as for example repetitions of both low and high entropy data (low entropy data is in fact repeated data) directly reduce the meaningful data amount for the analysis. For example, if the same 7.5 GB ISO image exists in 10000 customer storage locations, that reduces the actual meaningful data to about 246 bytes. The threat scanning service may be expected to scan data across multiple storage services, so even taking into account a conservative estimate of redundant data, 264 bytes of eligible (e.g., scannable) data remains a reasonable estimate of the amount of data to be scanned. Based on the estimated rate of growth of data (e.g., roughly doubling every 20 months, based on storage capacity evolution), the amount of eligible data is expected to grow to about 281 bytes over 30 years.

Taking into account the future growth of data size, the minimum amount of data needed for reliable detection can be computed as the size exponent number (or the number of bits needed to represent the size, 81) and divide it by 8, resulting in 10.125 bytes. It means a detection added today based on 10 non-repeating bytes would be enough for up to 30 years. Adding two more bytes, to a total of 12 non-repeating bytes, would reduce the probability of a false positive in the eligible data to 1/32768, or 0.0031% FP chance after 30 years.

The particles include non-repeating bytes because this is a fundamental trait of high entropy data, which is the type of data that yields the most useful amount of information. In other words, high entropy data is best for extracting threat definitions. For example, by choosing a string of 12 non-repeating bytes of a malicious archive would assure reliability of threat detection over time.

The problem is much of the threat data has medium entropy values, making it difficult to find good non-repeating byte patterns. To account for this, particles can be generated by counting 1 byte for every unique byte in a pattern, effectively not counting repeating bytes towards the pattern's total amount of information. However, it is often difficult to identify 12-byte particles, therefore it may be useful to use smaller particle sizes. For example, while a 6-byte particle may be found repeatedly in the eligible data set (across both threat samples and safe samples), the chance of that particle appearing in any particular sample is much smaller. As discussed, a particle this small may have an unacceptably high risk of false positives. Instead, if multiple, non-overlapping 6-byte particles are matched, then the confidence of matching a true threat increases. For example, the odds of finding multiple particles by chance in a single sample decrease exponentially with the sample size and linearly with the number of particles matched.

Accordingly, at numeral 2, the particle generator 108 generates particles for the known threat samples and known safe samples based on a number of particle properties. For example, the particles generated may be a minimum of 6 bytes. As discussed further below, particles may be encoded to fit into a primitive data type. For example, a u64 data type can include 8 bytes of data. An 8-byte particle can therefore be readily represented as a u64 type. However, a smaller particle with repeating bytes may not be so readily represented. For example, a 6-byte particle having three repeating bytes (e.g., 9 total bytes) may be compressed to be represented as a u64 type. Additional details regarding this compression scheme are provided below.

The particles can be added to their respective data store at numeral 3 (e.g., particles from known threats added to particle threat data store 126 and particles from known safe samples added to particle safe data store 128). Additionally, the association between the particles and the samples from which they are generated is also maintained. For example, the particles of a known threat sample can be stored in particle threat data store with an identifier associated with the threat sample from which they were generated, and likewise for the particles of safe samples.

In some embodiments, a threat definition (e.g., one or more particles and/or a sequence of particles) can be defined for each new family of threat samples. The particle generator 108 can generate particles for the samples associated with the new family of threat samples. As discussed, the particle generator 108 adds the particles to particle threat data store 126. Threat signature generator 130 can obtain the particles associated with the new family of threat samples using identifiers associated with the threat samples belonging to the new family at numeral 4. At numeral 5, the threat signature generator can determine a subset of the particles that appear in all of the threat samples belonging to the new family and/or a subset of particles that appear most frequently across the threat samples of the family Additionally, or alternatively, the threat signature generator 130 can determine a subset of the particles that appear in at least a threshold number of the threat samples of the new family. For example, if a particle appears in more than 75% (or other threshold number) of threat samples of the new family, then it can be added to the subset. This subset of particles can then be compared to the particles in the particle safe data store 128 at numeral 6. Any particles in the subset that collide with safe particles can be removed from the subset. The resulting subset of particles are those most likely to be associated with the threat of the new threat family and least likely to result in a false positive when used to classify unknown samples. The subset of particles can then be updated in the particle threat data store 126 at numeral 7 to be associated with a threat signature assigned to the new threat family As discussed, the threat signature may include a plurality of particles that are most likely to be shared among related threats and least likely to collide with particles of safe samples. In some embodiments, for a sample under test to match a given threat signature, the sample does not have to exactly match all of the particles in the threat signature. Instead, if a subset of particles match, then the sample can be classified as a threat for matching the threat signature. The number of particles needed to match may vary depending on the length of the particles, the data set size, etc. This produces more generic signatures that are not only reliable, but also resilient to changes in the threat samples, providing detection while threat samples may change. This way, as threats evolve, they can still be reliably identified, without requiring all particles to match.

Figure 2:
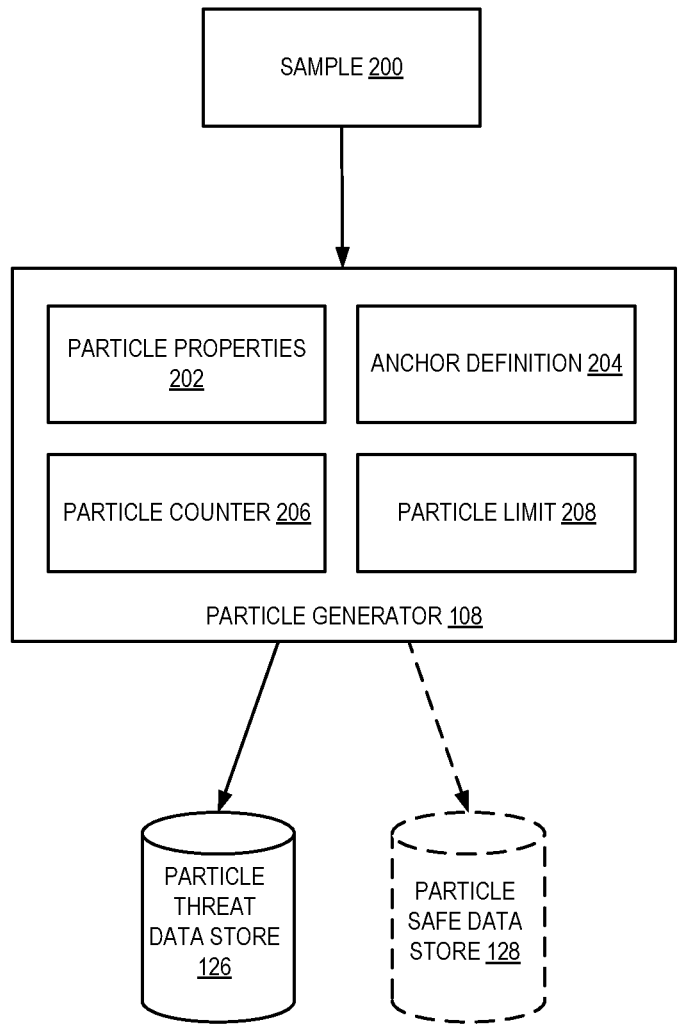
FIG. 2 is a diagram illustrating an example of a particle generator according to some embodiments.

FIG. 2 is a diagram illustrating an example of a particle generator according to some embodiments. As shown in FIG. 2, particle generator generates particles for a sample 200 (e.g., a file, archive, disk image, etc.), such as from sources 110 described above. The particle generator may include particle properties 202, an anchor definition 204, a particle counter 206, and a particle limit 208. As discussed, higher entropy data generally results in a better source of particles, since there are far fewer repetitions expected in it. However high entropy data is mostly a by-product of two major processes: compression, where certain patterns are reduced in order to save storage space; and encryption, where plaintext is transformed through some mathematical function. Both of these processes produce unique sets of data that change dramatically overall with small changes in the underlying data. This results in extracting a large number of particles that do not provide much information about the underlying samples. Accordingly, to keep the particle data stores lightweight, and to avoid adding less useful particles to the data stores, in some embodiments, particle generator 108 selectively stores particles based on where they are found in a given source.

In some embodiments, particle properties may include a particle size (e.g., minimum and/or maximum size), a particle type (e.g., the data type associated with the particle), and a repetition limit (e.g., the number of times a repeating byte can be present in a particle). Higher entropy data is associated with few or no repetitions. As such, particles that include no repetitions are associated with high entropy data, while particles that include repetitions are associated with lower entropy data. Lower entropy data is more likely to include useful data for threat matching purposes and therefore is more valuable for generating particles. As such, particles generated without repetitions may be discarded in favor of particles generated with one or more repetitions. Rather than discarding all no-repetition particles, or a random subset of no-repetition particles, embodiments selectively store particles that are associated with anchors.

In some embodiments, anchors are defined by a configurable anchor definition 204. In some embodiments, an anchor is defined as a particle having a maximum number of repetitions. For example, in some embodiments, when particle generator 108 generates a 6-byte particle which has been compression encoded with multiple byte repetitions, the particle generator identifies this particle as an anchor particle and starts a particle counter 206. The particle generator then stores a number of particles following the anchor particle up to a configurable particle limit 208. The particle limit 208 defines a number of consecutive no-repetition particles (also referred to as raw encoded particles) following the anchor particle. Each time a no-repetition particle is generated the particle counter is incremented and the particle is stored in particle threat data store 126 (or particle safe data store 128, depending on the type of source being processed. After the configurable number of consecutive particles have been stored, any further raw encoded particles are discarded until a new anchor particle is identified. The particle counter 206 is then reset, and the process continues. In some embodiments, the number of consecutive raw encoded particles can be between 4 and 128.

As such the particle generator can effectively navigate through higher entropy data using anchor particles. The particle generator extracts particles from the input data until a high entropy data block is encountered. Such a high entropy data block is identified when consecutive no-repetition particles are generated. The particle counter is used to count these consecutive no-repetition particles as they are extracted by the particle generator. When a threshold (e.g., the particle limit) is reached, then the particle generator stops storing the resulting particles until an anchor particle is extracted. Then the counter is reset, and no-repetition particles are once again stored. In some embodiments, if a particle that includes some repetitions is extracted, but which does not meet the requirements to be an anchor particle, then that particle is also discarded. Alternatively, such a particle is stored, but the counter is not reset until an anchor particle is encountered.

Statistically, given a large enough amount of high entropy data, then repetitions may occur randomly. The anchor particles may correspond to these random occurrences. By identifying these locations in the data, particles can be extracted from within the high entropy blocks, enabling particles to be generated from small regions of the high entropy data blocks. This way, particles are not only obtained from the beginning and ending of a source, where lower entropy data is typically found. These regions may end up being representative across multiple files and can be used to identify threat families By treating the lower entropy particles as anchors, embodiments can identify lower entropy portions of data without having to calculate the entropy of the data which is difficult to calculate reliably. Also, this provides a technique for selecting portions of the high entropy data to sample without relying on specific byte offsets which can be thwarted by an attacker by injecting random data into their threat.

In some embodiments, the value of the particle limit may vary between 4 and 128 particles. This means 4-128 no repetition particles are collected each time an anchor particle is encountered. The particular particle limit in a given implementation may vary depending on the accuracy of the threat matching required versus the size of the particle database that can be accommodated. For example, in some embodiments, if a four particle limit is adopted, the number of particles extracted on average from high entropy data blocks may be reduced by approximately 16000 times. In some embodiments, an optimal particle limit was found to be 64 particles which corresponds to a reduction in particle collection from high entropy data blocks of approximately 200 times. In one implementation, a 64 particle limit led to an overall reduction of a particle threat database of 2.5 times while maintaining the same scores for finding similarities.

Figure 3:
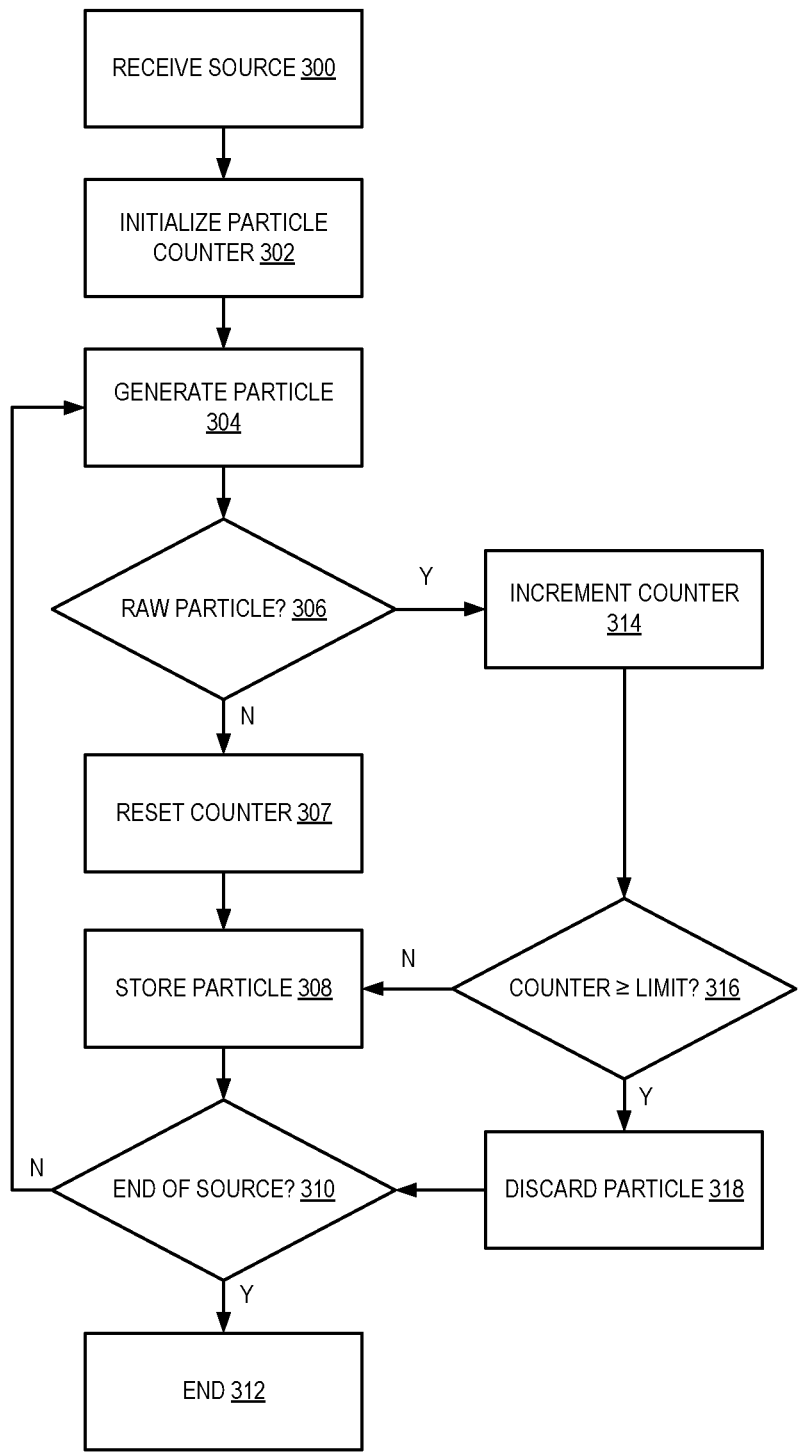
FIG. 3 is a diagram illustrating an example of a process of limiting particles from high entropy data according to some embodiments.

FIG. 3 is a diagram illustrating an example of a process of limiting particles from high entropy data according to some embodiments. As shown in FIG. 3, particle generation begins by receiving a source 300 to parse into particles. The particle generator then initializes a particle counter 302. For example, the particle counter is initialized to 0. Although the embodiment shown in FIG. 3 increments the counter from 0 and compares the counter value to a maximum value, in some embodiments, the particle counter may be initialized to the maximum value and the counter may be decremented to similar effect. The particle generator then begins parsing the source and generates a particle 304.

At 306, the particle generator determines whether the particle is a raw particle. As discussed, a raw particle, or no-repetition particle, is a particle that has not been compressed due to the presence of repeating bytes. If the particle is not a raw particle, then processing moves to block 307 and the counter is reset. As discussed, the counter tracks the number of consecutive raw particles. As such, when a compressed particle is generated, the consecutive streak is broken, and the counter needs to be reset. The particle is then stored at block 308 in the appropriate particle database. The particle generator then determines whether the end of the source has been reached at 310. If not, then the byte offset is incremented, and processing returns to block 304 to generate a next particle.

If the particle is a raw particle, then processing proceeds to block 314 and the particle counter is incremented. As discussed, in alternative embodiments, the particle counter may be initialized to the particle limit and decremented instead. At block 316, the particle generator determines whether the particle counter is equal to or greater than the particle limit. The particle limit defines the number of consecutive raw particles that are to be stored. As such, if the counter is less than the particle limit, then processing proceeds to block 308 and the particle is stored in the appropriate particle database. If the counter is greater than or equal to the particle limit, then processing proceeds to block 318 and the particle is discarded. Processing then proceeds to block 310 to determine whether the end of the source has been reached.

Figure 4:
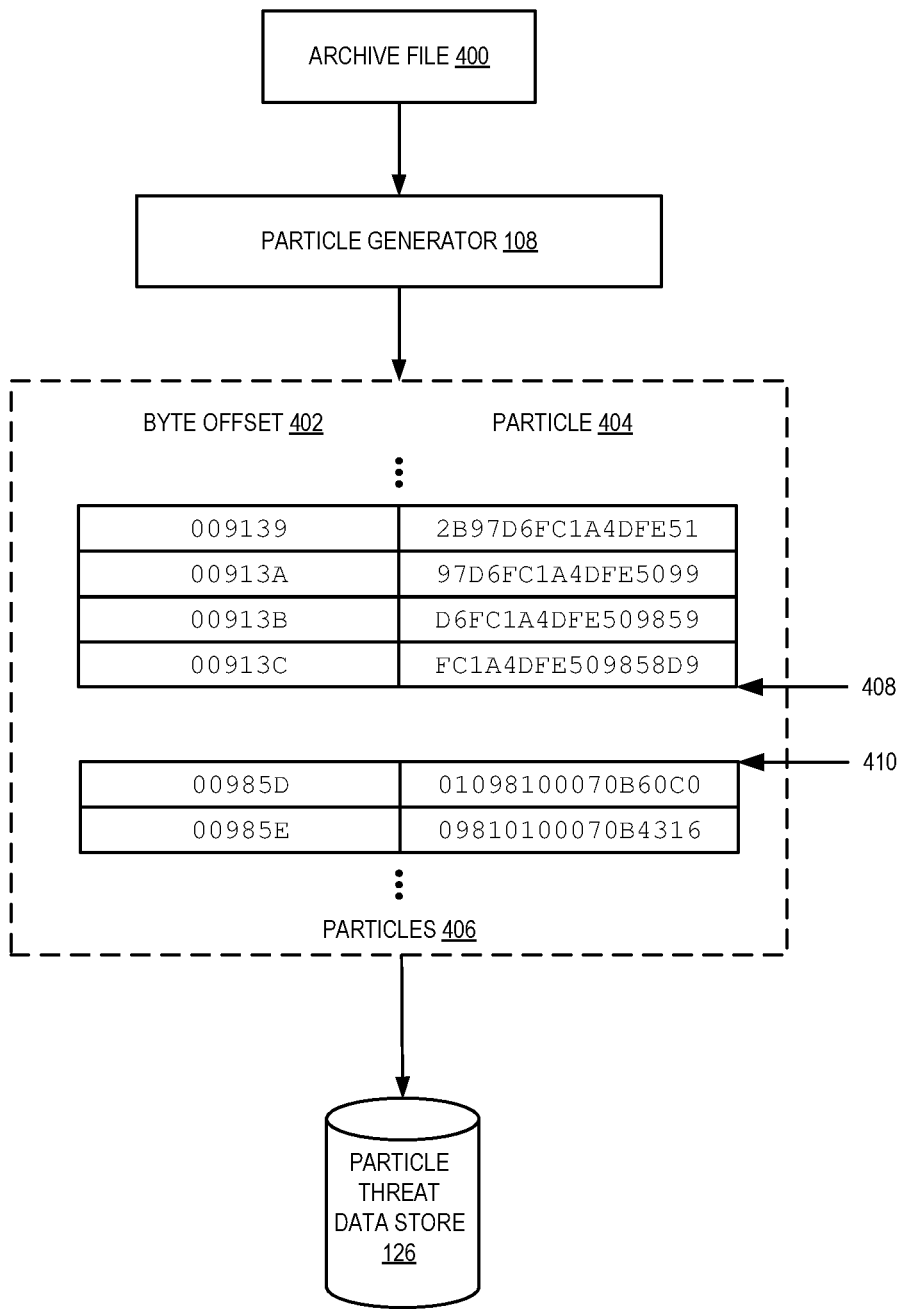
FIG. 4 is a diagram illustrating an example of particle generation according to some embodiments.

FIG. 4 is a diagram illustrating an example of particle generation according to some embodiments. In the example of FIG. 4, an archive file 400 is received by particle generator 108 to generate particles from the archive file. Archive file 400 represents a compressed file that has been compressed using one of various compression algorithms as are known in the art. Particle generator 108 then generates particles 406 as discussed above by parsing the bytes of the archive file and discarding raw particles after a threshold number of consecutive raw particles are generated. As shown, particles 406 represents a subset of possible particles generated for archive file 400. Particles 406 include the byte offset 402 in the archive file from which a corresponding particle 404 was generated. As shown, the byte offsets proceed in order 009139-00913C at which point the byte offset jumps to 00985D. This jump represents point at which the particle generator started discarding generated particles. For example, at 408, the particle limit is reached. Subsequently, raw particles are generated and discarded until at 410 an anchor particle (e.g., a compressed particle) is generated. At this point, the counter is reset, and the generated particles are then retained again until the counter reaches the particle limit. The particles that are generated and not discarded are then stored in particle threat data store 126. Although in this example, the archive file 400 is a known threat, were the archive file 400 a known safe file, then the resulting particles would be stored in particle safe data store 128.

Figure 5:
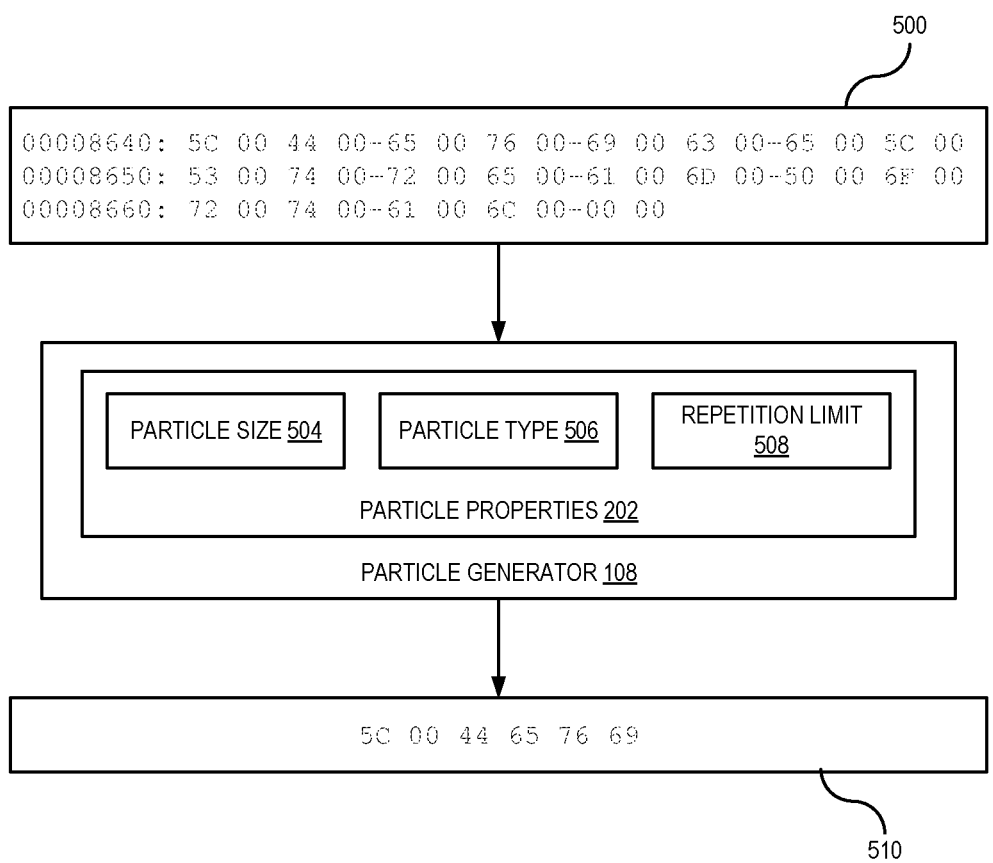
FIG. 5 is a diagram illustrating an example of particle generation according to some embodiments.

FIG. 5 is a diagram illustrating an example of particle generation according to some embodiments. As discussed, particle generator 108 can receive a sample 500 and generate a particle 510 based on various particle properties 202. For example, the particle properties 202 may include a particle size (e.g., minimum and/or maximum size), a particle type 506 (e.g., the data type associated with the particle), and a repetition limit 508 (e.g., the number of times a repeating byte can be present in a particle).

In some embodiments, the particle size 504 may be limited to at least 6 bytes. As discussed, smaller sized particles may appear too frequently to be useful for identifying threats (e.g., the chances for collisions with safe sample particles increase exponentially as the particle size is reduced). In some embodiments, the particle type 506 may be chosen to be a fixed width data type, and preferably a primitive data type. Using a standardized data type improves sample processing performance during threat scanning and other automated processing tasks. Additionally, in some embodiments, the repetition limit can be set to three repetitions. This enables some lower entropy types of data (such as Unicode strings) to be captured, while capturing particles with more repetitions would result in less useful information being captured in particles. Additionally, by limiting particles to at least 6 bytes, and at most three repetitions, the resulting 9-byte sequence can be compression encoded into a u64 type, as discussed below. The particle properties used for a given implementation may vary depending on the type and amount of data being scanned, the particle type being implemented, etc.

For example, sample 500 includes a sequence of bytes from a Unicode string 5C 00 44 00-65 00 76 00-69. Using the particle properties described above, each unique byte can be added to a particle and the particle can include up to three repetitions of bytes. For example, 5C 00 44 includes no repeating bytes, so three bytes have been added to the particle. The next byte 00 is a repetition of the second byte in the particle and is therefore removed. The next byte 65 is unique and added to the particle, resulting in 4 bytes, still short of the 6-byte minimum. The next byte is 00, a second repetition, and discarded. The next byte is 76, another unique byte which can be added to the particle resulting in 5 bytes. The next byte is 00, which is the third and maximum number of repetitions and is discarded. The next byte, 69 is unique and added to the particle. As such, the resulting particle 510 includes 6 bytes and three repetitions.

Figure 6:
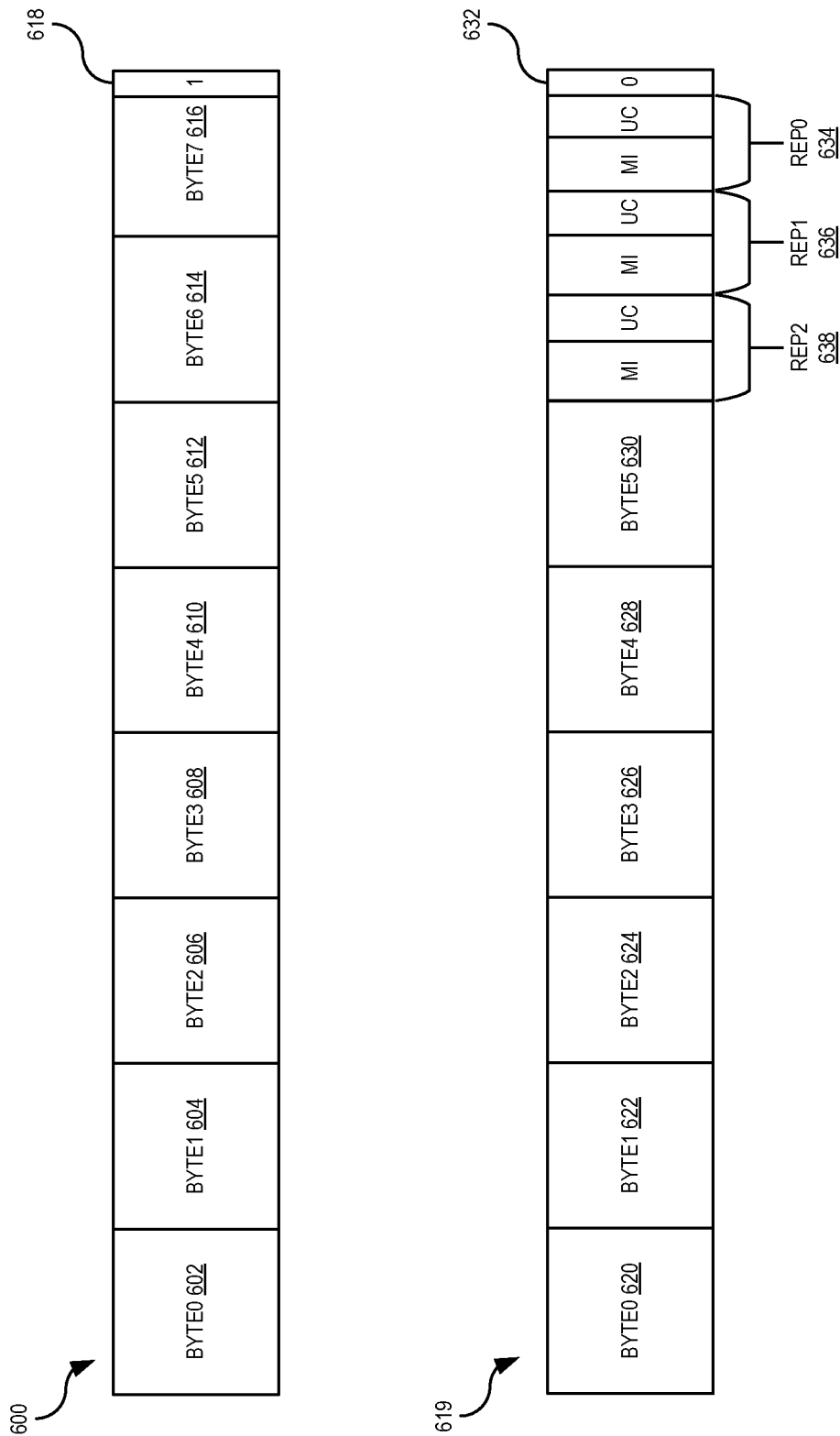
FIG. 6 is a diagram illustrating an example of particle encoding according to some embodiments.

FIG. 6 is a diagram illustrating an example of particle encoding according to some embodiments. As shown in FIG. 6, a u64 primitive type can be used to represent 8-byte particles with no repetitions, 7-byte particles with 1 repetition, or 6-byte particles with two repetitions. For example, each of these particles occupies the full 8 bytes of the u64 type. However, if up to three repetitions are allowed based on the particle properties, as described above, then 9 bytes would be needed to represent a 6-byte particle with three repetitions. Accordingly, embodiments implement a compression scheme to enable 6-byte particles with three repetitions to be represented using a u64 type, as shown in FIG. 6.

For example, as shown in FIG. 6, a u64 data type can include 8 bytes of particle data (e.g., byte0 602 to byte7 616). One bit, bit 618, can be reserved as a signal bit to indicate whether a given u64 has been compressed or whether it has not been compressed (e.g., if it is a raw encoding). As shown in FIG. 6, bit 618 is 1, indicating that the particle 600 is not compressed. Particle 619 shows an example of a compressed particle. As shown, particle 619 includes 6 bytes: byte0 620 to byte5 630. The last two bytes of data of the u64 particle are reserved to encode information representing the repetition data. The signal bit, bit 632, is 0 indicating that this particle 619 is compressed.

When the compression encoding is present, two bytes (e.g., 16 bits) including the signal bit are used to describe the repetitions inside the particle. Each repetition 634, 636, 638 is associated with a unique code (UC) and a match index (MI). The unique code is 2 bits and indicates the number of bytes before the repetition. The match index is 6 bits and indicates the index of the byte being repeated. In some embodiments, to optimize the particle validation and extraction process and to accommodate the compression encoding, particles are selected so that the first 6 bytes are different from each other. So byte0 602, byte1 604, and byte2 606 of particle 600 are all unique values. Likewise, byte0 620, byte1 622, and byte2 624 of particle 619 are all unique values. As such, repetitions can be found only starting with byte index 6, therefore a repetition at byte3 has a UC of 0. By using this scheme, the 9-byte array representing a particle can be compressed to the 64-bit structure and vice-versa.

Using the example of FIG. 4, the Unicode string 5C 00 44 00-65 00 76 00-69 can be encoded as particle 5C 00 44 65 76 69, this 6-byte array can be compressed into a particle as follows:

00 01 02 03 04 05

5C 00 44 65 76 69

As shown above, the Unicode string includes three repetitions of byte 00. when the three repeating bytes are removed, the 6-byte particle is the result. As such, rep0, rep1, and rep2 need to encode the positions and values of the repetitions that have been removed. Therefore, following byte2, corresponding to the value 44, is a repeated value of byte1, corresponding to the value 00. As such, the first repetition, rep0, is encoded as UC0=0, MI0=1. UC is equal to 0 because the repetition occurs at the first position (e.g., byte3) where a repetition can occur. MI is equal to 1, because byte1 is the byte value being repeated. The next repetition follows byte3. The UC value of rep1 is 1, as the next repeated byte follows byte3. The corresponding MI of rep1 is also 1, as the repeated byte is again a repetition of byte1. The final repetition follows byte4. The UC value of rep1 is 1, as the next repeated byte follows byte4. The corresponding MI of rep1 is also 1, as the repeated byte is again a repetition of byte1.

Figure 7:
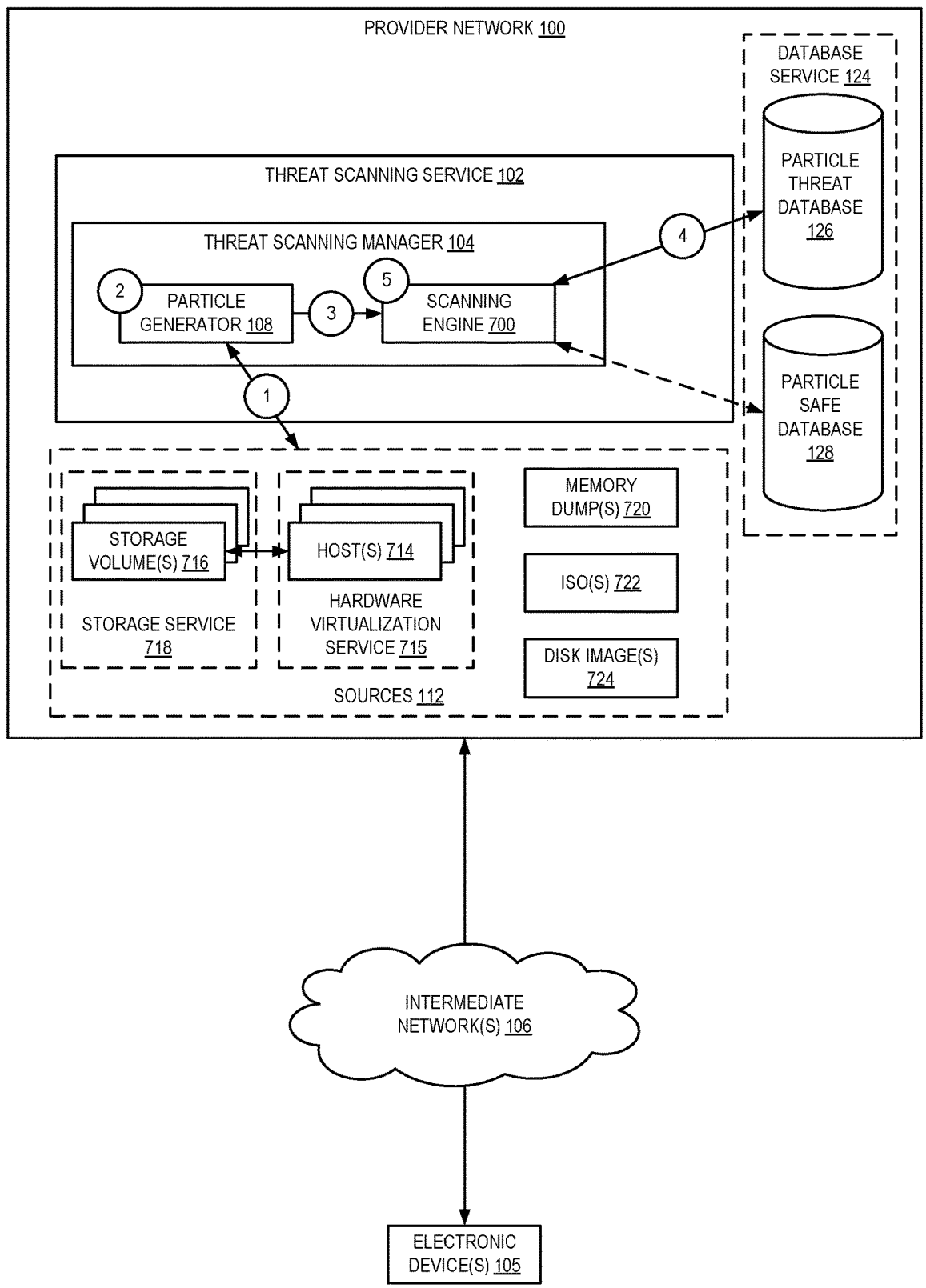
FIG. 7 is a diagram illustrating an environment for particle-based threat scanning according to some embodiments.

FIG. 7 is a diagram illustrating an environment for particle-based threat scanning according to some embodiments. In various embodiments, threat scanning service 102 scans samples from a plurality of sources, as shown at numeral 1. These sources 110 may include customer resources, provider network resources, etc. The threat scanning service 102 can compute particles for the samples and compare these particles to particle threat database 126 to identify malicious samples. Threat scanning manager 104 can manage periodic and/or on-demand threat scanning of sources 110. Sources 110 can include various data sources from which samples can be scanned. For example, sources 110 can include a plurality of storage volumes 716 maintained by storage service 718. These storage volumes may be mounted to a plurality of hosts 714 provided by hardware virtualization service 715. Additionally, or alternatively, the sources may include memory dumps 720, ISO containers, 722, disk images 724, etc.

The hardware virtualization service 715 (referred to in various implementations as an elastic compute service, a virtual machines service, a computing cloud service, a compute engine, or a cloud compute service) can enable users of the provider network 100 to provision and manage compute resources such as virtual machine instances. Virtual machine technology can use one physical server to run the equivalent of many servers (each of which is called a virtual machine), for example using a hypervisor, which may run at least on an offload card of the server (e.g., a card connected via PCI or PCIe to the physical CPUs and other components of the virtualization host may be used for some virtualization management components. Such an offload card of the host can include one or more CPUs that are not available to customer instances, but rather are dedicated to instance management tasks such as virtual machine management (e.g., a hypervisor), input/output virtualization to network-attached storage volumes, local migration management tasks, instance health monitoring, and the like). Virtual machines are commonly referred to as compute instances or simply "instances." As used herein, provisioning a virtual compute instance generally includes reserving resources (e.g., computational and memory resources) of an underlying physical compute instance for the client (e.g., from a pool of available physical compute instances and other resources), installing or launching required software (e.g., an operating system), and making the virtual compute instance available to the client for performing tasks specified by the client.

Particle generator 108 generates particles of the samples, as discussed above, at numeral 2. As discussed, during particle generation, a sample can be parsed to identify particles that have specific particle properties. For example, particles may have a minimum size in bytes, in number of repetitions, etc. Additionally, as discussed, particles may need to meet certain requirements for encoding purposes. For example, any particle identified that does not start with three unique bytes may be discarded. Likewise, any particle with more than a threshold number of repetitions and/or too small may be discarded. This parsing continues until the sample under test has been completely parsed into particles.

At numeral 3, the particles of a given sample are provided to a scanning engine 700 to be compared to particles in particle threat database 126. The scanning engine 700 can look up the particles in particle threat database 126, at numeral 4. Optionally, in some embodiments, the scanning engine can additionally cross reference the particles of the sample under test with particles from the particle safe database 128. This may be performed as queries, binary searches, etc. depending on the implementation of the particle threat database 126. As discussed, each particle in the particle threat database is associated with an identifier of the threat sample from which it was generated. Accordingly, the scanning engine can determine the overlap between the sample under test and known threat samples, at numeral 5. The scanning engine can compute a similarity index that represents this overlap. The similarity index may be calculated as a percentage of particles shared between the sample under test and each threat sample against the total number of particles of the sample under test. For example, if the sample under test has 1000 particles, and it shares 900 particles with a threat sample, then the similarity index is 90%. The higher the similarity index the more likely the samples are related, if it is 100% it is likely the samples are identical. but based on how we extract particles there could be some low entropy data that has changed so they are not identical. Accordingly, if the similarity index is above a configurable threshold value (e.g., 50%, 60%, etc.), then the sample under test can be automatically classified as a threat without additional analysis. This reduces the time required to identify threats, improving threat scanning performance In some embodiments, the scanning engine can attempt to match the particles of the sample to one or more threat signatures. As discussed, the threat signature may include a plurality of particles that are most likely to be shared among related threats and least likely to collide with particles of safe samples. If the scanning engine determines that the particles from the sample under test match (e.g., overlap) with at least a subset of the particles of a threat signature, then the sample under test can be classified as a threat for matching the threat signature. As discussed, the number of particles needed to match may vary depending on the length of the particles, the data set size, false positive risk, etc. This threshold number may be set by an administrator or other entity associated with the threat scanning service and/or the owner of the data being scanned.

In some embodiments, in addition to checking for matching particles, the scanning engine 700 can check for matching sequences of particles (e.g., matching particles that occur in the same order in multiple samples). Checking the matched particles' sequence yields exponential reduction in the false positive chance with the number of particles used, because the probability of each match to be in the desired sequence is on average 50% which adds 1 bit of information. The match sequence can be checked by making sure pattern ids increase with increasing match offsets.

Figure 8:
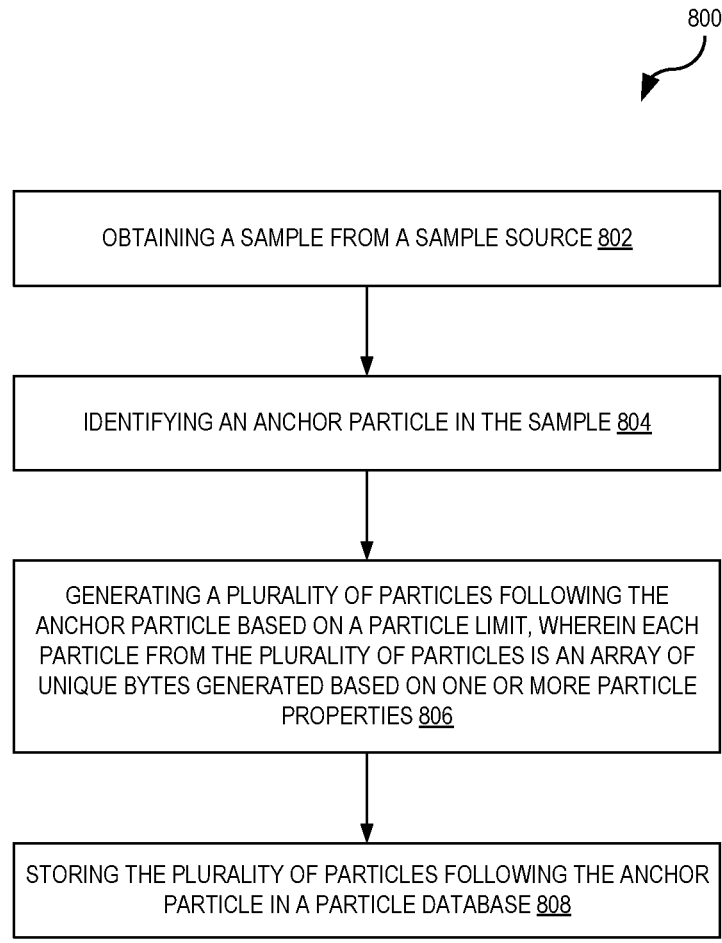
FIG. 8 is a flow diagram illustrating operations of a method for particle-based threat scanning according to some embodiments.

FIG. 8 is a flow diagram illustrating operations 800 of a method for particle-based threat scanning according to some embodiments. Some or all of the operations 800 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 800 are performed by threat scanning service 102 of the other figures.

The operations 800 include, at block 802, obtaining a sample from a sample source. In some embodiments, the sample source includes one or more of a storage service, a memory dump, a disk image, or an ISO container. Additionally, or alternatively, the sample source can include known threat samples (e.g., malware) and/or known safe samples (e.g., samples belonging to a safe list).

The operations 800 include, at block 804, identifying an anchor particle in the sample. In some embodiments, the anchor particle is a particle generated from a portion of the sample source that includes a plurality of data repetitions.

The operations 800 include, at block 806, generating a plurality of particles following the anchor particle based on a particle limit, wherein each particle from the plurality of particles is an array of unique bytes generated based on one or more particle properties. For example, the bytes of a particle are unique as compared to other bytes in that particle. In some embodiments, generating a plurality of particles includes initializing a particle counter, generating a first particle from the sample, determining the particle is a raw particle, and incrementing the particle counter. In some embodiments, generating a first particle from the sample further includes parsing the sample to identify a first array of bytes, and encoding the first array of unique bytes into the first particle, wherein a signal bit of the first particle includes a value indicating that the first particle is not compressed. As discussed, a particle that has not been compressed is also referred to as a raw particle or raw encoded particle.

In some embodiments, the operations further include generating a second particle, determining the second particle is a compressed particle, and resetting the particle counter. In some embodiments, generating the second particle includes parsing the sample to identify a first array of bytes, removing at least one repeating byte from the first array of bytes based on the one or more particle properties to generate a first array of unique bytes, and compressing the first array of unique bytes to generate a first particle by storing a value in a signal bit of the first particle to indicate that the first particle is compressed, and encoding a unique code and a match index for each of the at least one repeating byte removed from the first array of bytes, the unique code identifying a location of the at least one repeating byte in the first array of bytes, and the match index identifying a byte corresponding to a value of the at least one removed byte.

In some embodiments, the operations further include generating a second particle, determining a value of the particle counter is greater than or equal to a particle limit, and discarding the second particle. In some embodiments, the particle limit is 64 consecutive raw particles. In some embodiments, a minimum value of the particle limit is 4 consecutive raw particles. In some embodiments, the particle limit is between 4 and 128, inclusive, consecutive raw particles.

The operations 800 include, at block 808, storing the plurality of particles following the anchor particle in a particle database. As discussed, the particle database can include a particle threat database or a particle safe database. In alternative embodiments, different data structures may be maintained for the particles from safe samples and the particles from threat samples.

In some embodiments, generating a plurality of particles from the sample, wherein each particle from the plurality of particles is an array of unique bytes generated based on one or more particle properties, further comprises parsing the sample to identify a first array of bytes, removing at least one repeating byte from the first array of bytes based on the one or more particle properties to generate a first array of unique bytes, encoding the first array of unique bytes into a first particle, wherein a signal bit of the first particle includes a value indicating that the first particle is not compressed. In some embodiments, the one or more particle properties include one or more of a minimum number of bytes, a data type, or a maximum number of repeating bytes.

The operations 800 include, at block 806, determining whether the sample is associated with a known threat by comparing the plurality of particles to particle threat signatures in a threat database. In some embodiments, determining whether the sample is associated with a known threat by comparing the plurality of particles to particle threat signatures in a threat database, further comprises determining the plurality of particles from the sample overlap with a subset of particles associated with the threat signature and identifying the sample as a threat.

In some embodiments, the operations further include obtaining a plurality of samples associated with a threat family, generating a plurality of particles for each sample from the plurality of samples, identifying a subset of particles shared by the plurality of samples, and storing the subset of particles as a threat signature associated with the threat family.

In some embodiments, the operations include obtaining an archive file from a sample source of known malware, the archive file compressed with a compression algorithm, generating a first plurality of particles from the archive file based on a particle limit, wherein each particle is an array of unique bytes generated based on one or more particle properties, generating a second plurality of particles from the archive file following the particle limit until an anchor particle is identified, the anchor particle compressed to include three repetitions, discarding the second plurality of particles, generating a third plurality of particles following the anchor particle based on the particle limit, and storing the first plurality of particles and the third plurality of particles following the anchor particle in a particle threat database. In some embodiments, the particle limit defines a maximum number of consecutive raw encoded particles to be stored. In some embodiments, the anchor particle includes three byte repetitions. In some embodiments, generating a first plurality of particles from the archive file based on a particle limit, wherein each particle is an array of unique bytes generated based on one or more particle properties further includes incrementing a particle counter when an uncompressed particle is generated, and resetting the particle counter when a compressed particle is generated.

Figure 9:
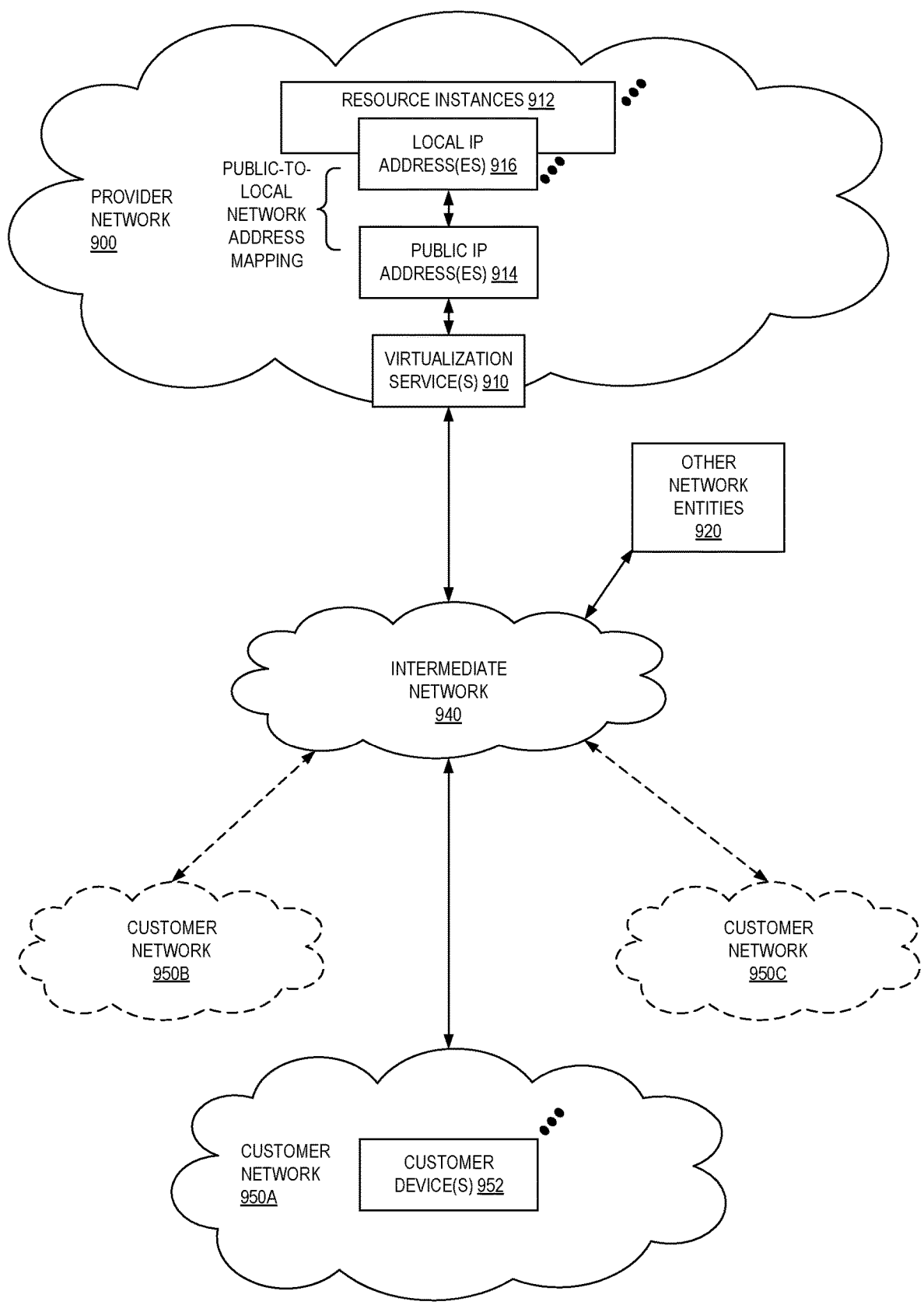
FIG. 9 illustrates an example provider network environment according to some embodiments.

FIG. 9 illustrates an example provider network (or "service provider system") environment according to some embodiments. A provider network 900 may provide resource virtualization to customers via one or more virtualization services 910 that allow customers to purchase, rent, or otherwise obtain instances 912 of virtualized resources, including but not limited to computation and storage resources, implemented on devices within the provider network or networks in one or more data centers. Local Internet Protocol (IP) addresses 916 may be associated with the resource instances 912; the local IP addresses are the internal network addresses of the resource instances 912 on the provider network 900. In some embodiments, the provider network 900 may also provide public IP addresses 914 and/or public IP address ranges (e.g., Internet Protocol version 4 (IPv4) or Internet Protocol version 9 (IPv6) addresses) that customers may obtain from the provider 900.

Conventionally, the provider network 900, via the virtualization services 910, may allow a customer of the service provider (e.g., a customer that operates one or more client networks 950A-950C including one or more customer device(s) 952) to dynamically associate at least some public IP addresses 914 assigned or allocated to the customer with particular resource instances 912 assigned to the customer. The provider network 900 may also allow the customer to remap a public IP address 914, previously mapped to one virtualized computing resource instance 912 allocated to the customer, to another virtualized computing resource instance 912 that is also allocated to the customer. Using the virtualized computing resource instances 912 and public IP addresses 914 provided by the service provider, a customer of the service provider such as the operator of customer network(s) 950A-950C may, for example, implement customer-specific applications and present the customer's applications on an intermediate network 940, such as the Internet. Other network entities 920 on the intermediate network 940 may then generate traffic to a destination public IP address 914 published by the customer network(s) 950A-950C; the traffic is routed to the service provider data center, and at the data center is routed, via a network substrate, to the local IP address 916 of the virtualized computing resource instance 912 currently mapped to the destination public IP address 914. Similarly, response traffic from the virtualized computing resource instance 912 may be routed via the network substrate back onto the intermediate network 940 to the source entity 920.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 900; a customer may then assign their allocated public IP addresses to particular resource instances allocated to the customer. These public IP addresses may be referred to as customer public IP addresses, or simply customer IP addresses. Instead of being assigned by the provider network 900 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 10:
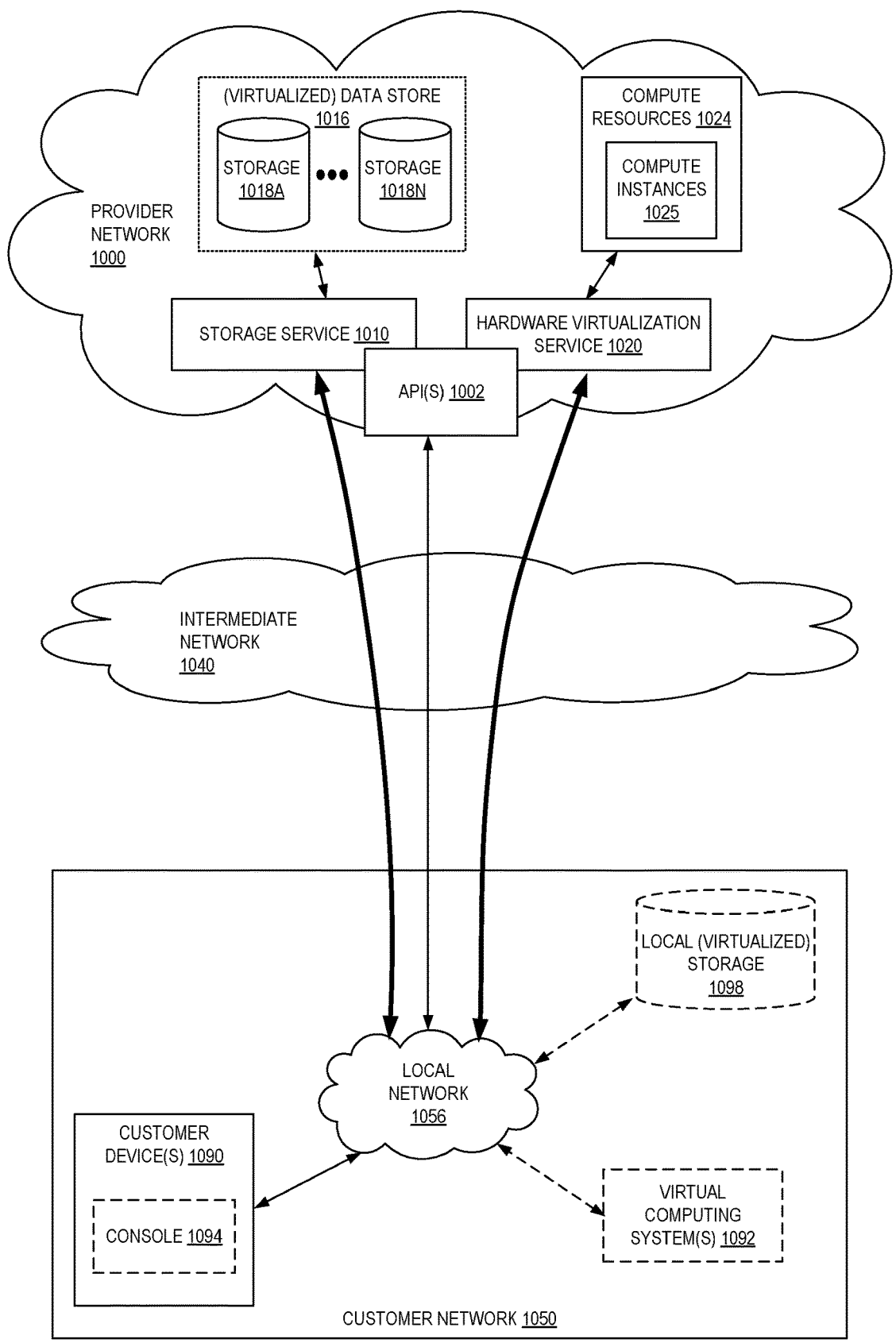
FIG. 10 is a block diagram of an example provider network that provides a storage service and a hardware virtualization service to customers according to some embodiments.

FIG. 10 is a block diagram of an example provider network that provides a storage service and a hardware virtualization service to customers, according to some embodiments. Hardware virtualization service 1020 provides multiple compute resources 1024 (e.g., compute instances 1025 such as VMs) to customers. The compute resources 1024 may, for example, be rented or leased to customers of the provider network 1000 (e.g., to a customer that implements customer network 1050). Each computation resource 1024 may be provided with one or more local IP addresses. Provider network 1000 may be configured to route packets from the local IP addresses of the compute resources 1024 to public Internet destinations, and from public Internet sources to the local IP addresses of compute resources 1024.

Provider network 1000 may provide a customer network 1050, for example coupled to intermediate network 1040 via local network 1056, the ability to implement virtual computing systems 1092 via hardware virtualization service 1020 coupled to intermediate network 1040 and to provider network 1000. In some embodiments, hardware virtualization service 1020 may provide one or more APIs 1002, for example a web services interface, via which a customer network 1050 may access functionality provided by the hardware virtualization service 1020, for example via a console 1094 (e.g., a web-based application, standalone application, mobile application, etc.). In some embodiments, at the provider network 1000, each virtual computing system 1092 at customer network 1050 may correspond to a computation resource 1024 that is leased, rented, or otherwise provided to customer network 1050.

From an instance of a virtual computing system 1092 and/or another customer device 1090 (e.g., via console 1094), the customer may access the functionality of storage service 1010, for example via one or more APIs 1002, to access data from and store data to storage resources 1018A-1018N of a virtual data store 1016 (e.g., a folder or "bucket", a virtualized volume, a database, etc.) provided by the provider network 1000. In some embodiments, a virtualized data store gateway (not shown) may be provided at the customer network 1050 that may locally cache at least some data, for example frequently-accessed or critical data, and that may communicate with storage service 1010 via one or more communications channels to upload new or modified data from a local cache so that the primary store of data (virtualized data store 1016) is maintained. In some embodiments, a user, via a virtual computing system 1092 and/or on another customer device 1090, may mount and access virtual data store 1016 volumes via storage service 1010 acting as a storage virtualization service, and these volumes may appear to the user as local (virtualized) storage 1098.

While not shown in FIG. 10, the virtualization service(s) may also be accessed from resource instances within the provider network 1000 via API(s) 1002. For example, a customer, appliance service provider, or other entity may access a virtualization service from within a respective virtual network on the provider network 1000 via an API 1002 to request allocation of one or more resource instances within the virtual network or within another virtual network.

Illustrative Systems

Figure 11:
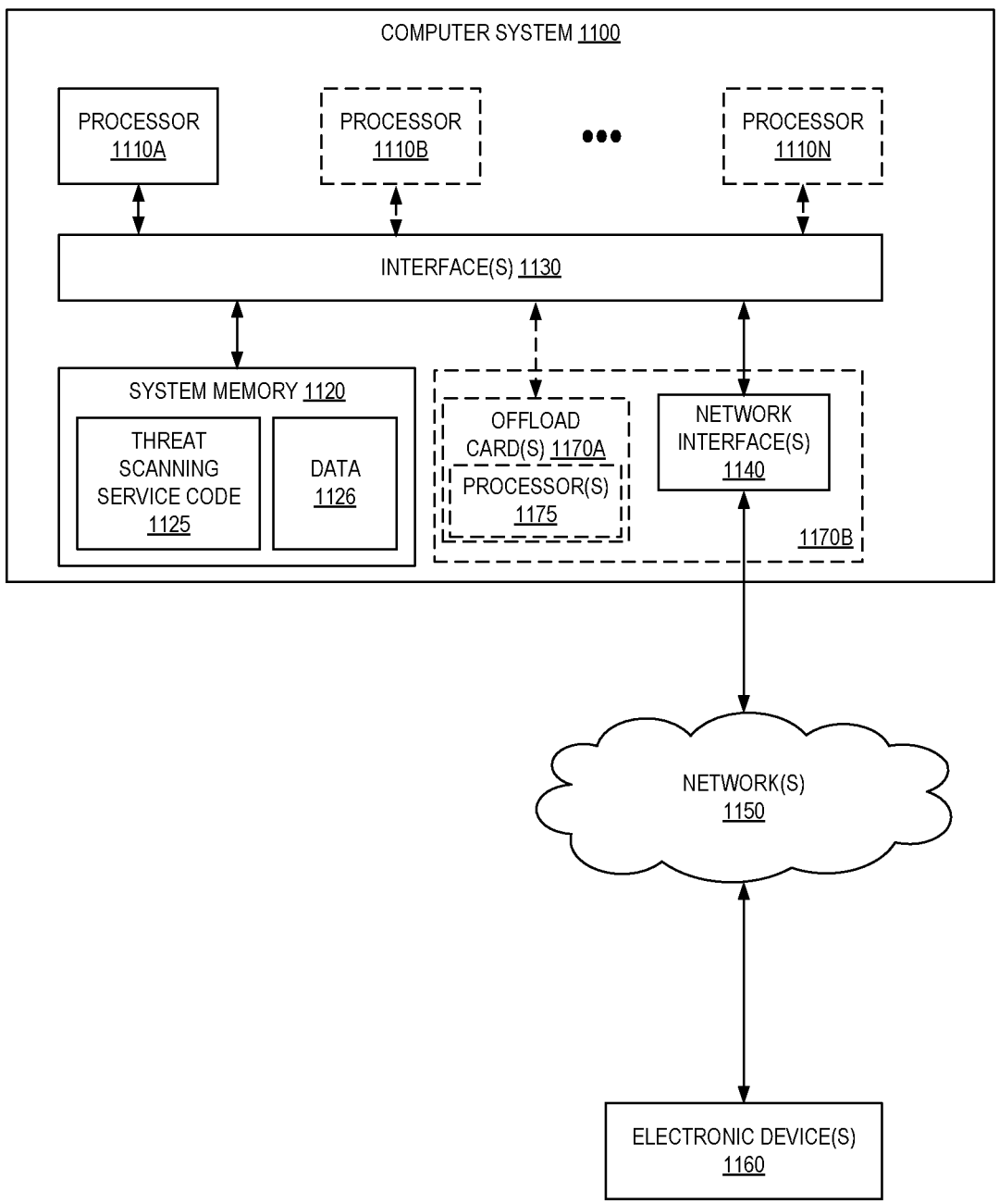
FIG. 11 is a block diagram illustrating an example computer system that may be used in some embodiments.

In some embodiments, a system that implements a portion or all of the techniques described herein may include a general-purpose computer system that includes or is configured to access one or more computer-accessible media, such as computer system 1100 illustrated in FIG. 11. In the illustrated embodiment, computer system 1100 includes one or more processors 1110 coupled to a system memory 1120 via an input/output (I/O) interface 1130. Computer system 1100 further includes a network interface 1140 coupled to I/O interface 1130. While FIG. 11 shows computer system 1100 as a single computing device, in various embodiments a computer system 1100 may include one computing device or any number of computing devices configured to work together as a single computer system 1100.

In various embodiments, computer system 1100 may be a uniprocessor system including one processor 1110, or a multiprocessor system including several processors 1110 (e.g., two, four, eight, or another suitable number). Processors 1110 may be any suitable processors capable of executing instructions. For example, in various embodiments, processors 1110 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 1110 may commonly, but not necessarily, implement the same ISA.

System memory 1120 may store instructions and data accessible by processor(s) 1110. In various embodiments, system memory 1120 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 1120 as threat scanning service code 1125 (e.g., executable to implement, in whole or in part, the threat scanning service 102) and data 1126.

In one embodiment, I/O interface 1130 may be configured to coordinate I/O traffic between processor 1110, system memory 1120, and any peripheral devices in the device, including network interface 1140 or other peripheral interfaces. In some embodiments, I/O interface 1130 may perform any necessary protocol, timing or other data transformations to convert data signals from one component (e.g., system memory 1120) into a format suitable for use by another component (e.g., processor 1110). In some embodiments, I/O interface 1130 may include support for devices attached through various types of peripheral buses, such as a variant of the Peripheral Component Interconnect (PCI) bus standard or the Universal Serial Bus (USB) standard, for example. In some embodiments, the function of I/O interface 1130 may be split into two or more separate components, such as a north bridge and a south bridge, for example. Also, in some embodiments some or all of the functionality of I/O interface 1130, such as an interface to system memory 1120, may be incorporated directly into processor 1110.

Network interface 1140 may be configured to allow data to be exchanged between computer system 1100 and other devices 1160 attached to a network or networks 1150, such as other computer systems or devices as illustrated in FIG. 1, for example. In various embodiments, network interface 1140 may support communication via any suitable wired or wireless general data networks, such as types of Ethernet network, for example. Additionally, network interface 1140 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 1100 includes one or more offload cards 1170A or 1170B (including one or more processors 1175, and possibly including the one or more network interfaces 1140) that are connected using an I/O interface 1130 (e.g., a bus implementing a version of the Peripheral Component Interconnect—Express (PCI-E) standard, or another interconnect such as a QuickPath interconnect (QPI) or UltraPath interconnect (UPI)). For example, in some embodiments the computer system 1100 may act as a host electronic device (e.g., operating as part of a hardware virtualization service) that hosts compute resources such as compute instances, and the one or more offload cards 1170A or 1170B execute a virtualization manager that can manage compute instances that execute on the host electronic device. As an example, in some embodiments the offload card(s) 1170A or 1170B can perform compute instance management operations such as pausing and/or un-pausing compute instances, launching and/or terminating compute instances, performing memory transfer/copying operations, etc. These management operations may, in some embodiments, be performed by the offload card(s) 1170A or 1170B in coordination with a hypervisor (e.g., upon a request from a hypervisor) that is executed by the other processors 1110A-1110N of the computer system 1100. However, in some embodiments the virtualization manager implemented by the offload card(s) 1170A or 1170B can accommodate requests from other entities (e.g., from compute instances themselves), and may not coordinate with (or service) any separate hypervisor.

In some embodiments, system memory 1120 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 1100 via I/O interface 1130. A non-transitory computer-accessible storage medium may also include any volatile or non-volatile media such as RAM (e.g., SDRAM, double data rate (DDR) SDRAM, SRAM, etc.), read only memory (ROM) etc., that may be included in some embodiments of computer system 1100 as system memory 1120 or another type of memory. Further, a computer-accessible medium may include transmission media or signals such as electrical, electromagnetic, or digital signals, conveyed via a communication medium such as a network and/or a wireless link, such as may be implemented via network interface 1140.

Various embodiments discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of widely-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, PHP, or TCL, as well as combinations thereof. The server(s) may also include database servers, including without limitation those commercially available from Oracle(R), Microsoft(R), Sybase(R), IBM(R), etc. The database servers may be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 718A-718N) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
    obtaining an archive file from a sample source of known malware, the archive file compressed with a compression algorithm;
    generating a first plurality of particles from the archive file based on a particle limit, wherein each particle is an array of unique bytes generated based on one or more particle properties;
    generating a second plurality of particles from the archive file following the particle limit until an anchor particle is identified, the anchor particle compressed to include three repetitions;
    discarding the second plurality of particles;
    generating a third plurality of particles following the anchor particle based on the particle limit; and
    storing the first plurality of particles and the third plurality of particles following the anchor particle in a particle threat database.

2. The computer-implemented method of claim 1, wherein the particle limit defines a maximum number of consecutive raw encoded particles to be stored.

3. The computer-implemented method of claim 1, wherein generating a first plurality of particles from the archive file based on a particle limit, wherein each particle is an array of unique bytes generated based on one or more particle properties further comprises:
    incrementing a particle counter when an uncompressed particle is generated; and
    resetting the particle counter when a compressed particle is generated.

4. A computer-implemented method comprising:
    obtaining a sample from a sample source;
    identifying an anchor particle in the sample, wherein the anchor particle includes byte repetitions;
    generating a plurality of particles following the anchor particle, wherein each particle from the plurality of particles is an array of unique bytes generated based on one or more particle properties;

storing the plurality of particles following the anchor particle in a particle database until a particle limit is reached; and after reaching the particle limit, discarding subsequent particles until another anchor particle is identified in the sample.

5. The computer-implemented method of claim 4, wherein the anchor particle is a particle generated from a portion of the sample source that includes a plurality of data repetitions.

6. A computer-implemented method comprising:

obtaining a sample from a sample source;

identifying an anchor particle in the sample, wherein the anchor particle includes byte repetitions;

generating a plurality of particles following the anchor particle based on a particle limit, wherein each particle from the plurality of particles is an array of unique bytes generated based on one or more particle properties, the generating comprising:

initializing a particle counter;

generating a first particle from the sample;

determining the first particle is a raw particle; and incrementing the particle counter; and storing the plurality of particles following the anchor particle in a particle database.

7. The computer-implemented method of claim 6, wherein generating a first particle from the sample, further comprises:

parsing the sample to identify a first array of unique bytes; and encoding the first array of unique bytes into the first particle, wherein a signal bit of the first particle includes a value indicating that the first particle is not compressed.

8. The computer-implemented method of claim 6, further comprising:

generating a second particle;

determining the second particle is a compressed particle; and resetting the particle counter.

9. The computer-implemented method of claim 8, wherein generating a second particle, further comprises:

parsing the sample to identify a second array of bytes;

removing at least one repeating byte from the second array of bytes based on the one or more particle properties to generate a second array of unique bytes; and compressing the second array of unique bytes to generate the second particle by:

storing a value in a signal bit of the second particle to indicate that the second particle is compressed; and encoding a unique code and a match index for each of the at least one repeating byte removed from the second array of bytes, the unique code identifying a location of the at least one repeating byte in the second array of bytes, and the match index identifying a byte corresponding to a value of the at least one removed byte.

10. The computer-implemented method of claim 6, further comprising:

generating a second particle;

determining a value of the particle counter is greater than or equal to a particle limit; and discarding the second particle.

11. The computer-implemented method of claim 4, wherein the particle limit is 64 consecutive raw particles.

12. The computer-implemented method of claim 4, wherein a minimum value of the particle limit is 4 consecutive raw particles.

13. The computer-implemented method of claim 4, wherein the particle limit is between 4 and 128, inclusive, consecutive raw particles.

14. A system comprising:

a first one or more electronic devices to implement a database service in a multi-tenant provider network; and a second one or more electronic devices to implement a threat scanning service in the multi-tenant provider network, the threat scanning service including instructions that upon execution cause the threat scanning service to:

obtain a sample from a sample source;

identify an anchor particle in the sample, wherein the anchor particle includes byte repetitions;

generate a plurality of particles following the anchor particle, wherein each particle from the plurality of particles is an array of unique bytes generated based on one or more particle properties;

store the plurality of particles following the anchor particle in a particle database until a particle limit is reached; and after reaching the particle limit, discard subsequent particles until another anchor particle is identified in the sample.

15. The system of claim 14, wherein the anchor particle is a particle generated from a portion of the sample source that includes a plurality of data repetitions.

16. A system comprising:

a first one or more electronic devices to implement a database service in a multi-tenant provider network; and a second one or more electronic devices to implement a threat scanning service in the multi-tenant provider network, the threat scanning service including instructions that upon execution cause the threat scanning service to:

obtain a sample from a sample source;

identify an anchor particle in the sample, wherein the anchor particle includes byte repetitions;

generate a plurality of particles following the anchor particle based on a particle limit, wherein each particle from the plurality of particles is an array of unique bytes generated based on one or more particle properties, the generating comprising:

initializing a particle counter;

generating a first particle from the sample;

determining the first particle is a raw particle; and incrementing the particle counter; and store the plurality of particles following the anchor particle in a particle database.

17. The system of claim 16, wherein to generate a particle from the sample, the instructions, when executed, further cause the threat scanning service to:

parse the sample to identify a first array of unique bytes; and encode the first array of unique bytes into the first particle, wherein a signal bit of the first particle includes a value indicating that the first particle is not compressed.

18. The system of claim 16, wherein the instructions, when executed, further cause the threat scanning service to:
- generate a second particle;
- determine the second particle is a compressed particle; and
- reset the particle counter.

19. The system of claim 18, wherein to generate a second particle, the instructions, when executed, further cause the threat scanning service to:
- parse the sample to identify a second array of bytes;
- remove at least one repeating byte from the second array of bytes based on the one or more particle properties to generate a second array of unique bytes; and
- compress the second array of unique bytes to generate the second particle by:
  - storing a value in a signal bit of the second particle to indicate that the second particle is compressed; and
  - encoding a unique code and a match index for each of the at least one repeating byte removed from the second array of bytes, the unique code identifying a location of the at least one repeating byte in the second array of bytes, and the match index identifying a byte corresponding to a value of the at least one removed byte.

20. The system of claim 16, wherein the instructions, when executed, further cause the threat scanning service to:
- generate a second particle;
- determine a value of the particle counter is greater than or equal to a particle limit; and
- discard the second particle.

* * * * *